US011526688B2

(12) United States Patent
Mihindukulasooriya et al.

(10) Patent No.: US 11,526,688 B2
(45) Date of Patent: Dec. 13, 2022

(54) DISCOVERING RANKED DOMAIN RELEVANT TERMS USING KNOWLEDGE

(71) Applicant: International Business Machines Corporation, Armonk, NY (US)

(72) Inventors: Nandana Mihindukulasooriya, Cambridge, MA (US); Ruchi Mahindru, Elmsford, NY (US); Md Faisal Mahbub Chowdhury, Woodside, NY (US); Yu Deng, Yorktown Heights, NY (US); Alfio Massimiliano Gliozzo, Brooklyn, NY (US); Sarthak Dash, Jersey City, NJ (US); Nicolas Rodolfo Fauceglia, Brooklyn, NY (US); Gaetano Rossiello, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 16/850,735

(22) Filed: Apr. 16, 2020

(65) Prior Publication Data

US 2021/0326636 A1 Oct. 21, 2021

(51) Int. Cl.
*G06K 9/62* (2022.01)
*G06F 40/205* (2020.01)
(Continued)

(52) U.S. Cl.
CPC ........... *G06K 9/623* (2013.01); *G06F 40/205* (2020.01); *G06F 40/30* (2020.01); *G06F 40/40* (2020.01);
(Continued)

(58) Field of Classification Search
CPC .... G06K 9/623; G06K 9/6215; G06K 9/6218; G06K 9/6232; G06F 40/205; G06F 40/30; G06F 40/40; G06N 20/00; G06N 5/02
See application file for complete search history.

(56) References Cited

U.S. PATENT DOCUMENTS 8,650,031 B1 * 2/2014 Mamou ................... G06F 16/00
707/738
9,514,113 B1 * 12/2016 Shaw ..................... G06F 16/958
(Continued)

FOREIGN PATENT DOCUMENTS

EP         3885962 A1 *  9/2021  ............. G06F 3/167
WO    WO-2018085401 A  *  5/2018  ........... G06F 16/287
WO    WO-2021000676 A1 *  1/2021

OTHER PUBLICATIONS

Hoffart et al., "Robust Disambiguation of Named Entities", Proceedings of the 2011 Conference on Empirical Methods in Natural Language Processing, pp. 782-792, Edinburgh, Scotland, UK, Jul. 27-31, 2011. 2011 Association for Computational Linguistics. (Year: 2011).*

(Continued)

*Primary Examiner* — Anne L Thomas-Homescu
(74) *Attorney, Agent, or Firm* — Sherman IP LLP; Kenneth L. Sherman; Hemavathy Perumal

(57) ABSTRACT

One embodiment of the invention provides a method for terminology ranking for use in natural language processing. The method comprises receiving a list of terms extracted from a corpus, where the list comprises a ranking of the terms based on frequencies of the terms across the corpus. The method further comprises accessing a domain ontology associated with the corpus, and re-ranking the list based on the domain ontology. The resulting re-ranked list comprises a different ranking of the terms based on relevance of the terms using knowledge from the domain ontology. The (Continued)

method further comprises generating clusters of terms via a trained model adapted to the corpus, and boosting a rank of at least one term of the re-ranked list based on the clusters to increase a relevance of the at least one term using knowledge from the trained model.

20 Claims, 12 Drawing Sheets

(51) Int. Cl.
    *G06N 20/00*     (2019.01)
    *G06F 40/40*     (2020.01)
    *G06F 40/30*     (2020.01)
    *G06N 5/02*     (2006.01)

(52) U.S. Cl.
    CPC ......... *G06K 9/6215* (2013.01); *G06K 9/6218* (2013.01); *G06K 9/6232* (2013.01); *G06N 5/02* (2013.01); *G06N 20/00* (2019.01)

(56) References Cited

U.S. PATENT DOCUMENTS

| | | | | |
|---|---|---|---|---|
| 9,665,643 | B2* | 5/2017 | Li | G06F 16/9535 |
| 9,843,649 | B1* | 12/2017 | Hampson | G06Q 30/0264 |
| 10,157,226 | B1* | 12/2018 | Costabello | G06F 16/9024 |
| 10,224,119 | B1* | 3/2019 | Heinrich | G16H 10/60 |
| 10,229,164 | B1* | 3/2019 | Hampson | G06F 16/24578 |
| 10,262,079 | B1* | 4/2019 | Costabello | G16H 20/30 |
| 10,496,691 | B1* | 12/2019 | Chen | G06F 16/35 |
| 10,621,183 | B1* | 4/2020 | Chatterjee | G06F 16/9535 |
| 11,201,890 | B1* | 12/2021 | Coull | H04L 63/1416 |
| 11,288,453 | B1* | 3/2022 | Vinicombe | G06F 40/284 |
| 11,294,974 | B1* | 4/2022 | Shukla | G06F 16/90335 |
| 2013/0232263 | A1* | 9/2013 | Kelly | G06Q 10/10 709/224 |
| 2015/0088910 | A1* | 3/2015 | Misra | G06F 40/131 707/749 |
| 2015/0371639 | A1* | 12/2015 | Foerster | G10L 17/06 704/233 |
| 2016/0162514 | A1* | 6/2016 | Cheung | G06F 16/958 707/741 |
| 2016/0188719 | A1* | 6/2016 | Glover | G06F 40/134 707/706 |
| 2016/0379120 | A1* | 12/2016 | Merdivan | G06F 16/3344 706/46 |
| 2017/0214589 | A1* | 7/2017 | Conover | G06Q 50/01 |
| 2017/0228461 | A1* | 8/2017 | Lev | G06F 40/295 |
| 2017/0236032 | A1* | 8/2017 | Lin | G06V 10/454 382/159 |
| 2017/0364586 | A1* | 12/2017 | Krishnamurthy | G06F 16/3329 |
| 2017/0371955 | A1* | 12/2017 | Allen | G06F 16/3329 |
| 2017/0372630 | A1* | 12/2017 | Janes | G06F 40/20 |
| 2018/0039889 | A1* | 2/2018 | Nanavati | G06F 16/93 |
| 2018/0060437 | A1* | 3/2018 | Gao | G06F 16/951 |
| 2018/0082183 | A1* | 3/2018 | Hertz | G06N 5/00 |
| 2018/0189292 | A1* | 7/2018 | Grace, Jr. | G06F 16/93 |
| 2018/0276196 | A1* | 9/2018 | Chowdhury | G06F 16/24578 |
| 2019/0155926 | A1* | 5/2019 | Scheideler | G06F 16/215 |
| 2019/0155944 | A1* | 5/2019 | Mahata | G06F 16/3344 |
| 2019/0205322 | A1* | 7/2019 | Dobrynin | G06F 40/186 |
| 2019/0205325 | A1* | 7/2019 | Dobrynin | G06F 16/3344 |
| 2019/0205391 | A1* | 7/2019 | Dobrynin | G06F 9/454 |
| 2019/0220471 | A1* | 7/2019 | Mota Toledo | G06N 7/005 |
| 2019/0220524 | A1* | 7/2019 | Costabello | G06N 5/045 |
| 2019/0236206 | A1* | 8/2019 | Chowdhury | G06F 40/242 |
| 2019/0303459 | A1* | 10/2019 | Yan | G06F 16/35 |
| 2019/0370406 | A1* | 12/2019 | Bose | H04L 41/0893 |
| 2020/0074871 | A1* | 3/2020 | Zhou | G09B 5/00 |
| 2020/0104337 | A1* | 4/2020 | Kelly | G06F 16/906 |
| 2020/0160231 | A1* | 5/2020 | Asthana | G06F 16/9024 |
| 2020/0257761 | A1* | 8/2020 | Bull | G06F 40/289 |
| 2021/0021612 | A1* | 1/2021 | Higbee | H04L 63/1491 |
| 2021/0109968 | A1* | 4/2021 | Kim | G06Q 30/0282 |
| 2021/0110811 | A1* | 4/2021 | Joseph | G10L 13/0335 |
| 2021/0209500 | A1* | 7/2021 | Hu | G06N 5/04 |
| 2021/0256036 | A1* | 8/2021 | Luo | G06F 16/285 |
| 2021/0294859 | A1* | 9/2021 | Watson | A61K 47/24 |
| 2022/0066533 | A1* | 3/2022 | Endoh | G06F 1/3275 |
| 2022/0172247 | A1* | 6/2022 | Rosen | G06F 16/35 |

OTHER PUBLICATIONS

Yamada et al., "Joint Learning of the Embedding of Words and Entities for Names Entity Disambiguation", Proceedings of the 20th SIGNLL Conference on Computational Natural Language Learning (CoNLL), pp. 250-259, Berlin, Germany, Aug. 7-12, 2016. 2016 Association for Computational Linguistics. (Year: 2016).*

Hegde-Talukdar, "An Entity-centric Approach for Overcoming Knowledge Graph Scarcity", Proceedings of the 2015 Conference on Empirical Methods in Natural Language Processing, pp. 530-535, Lisbon, Portugal, Sep. 17-21, 2015. 2015 Association for Computational Linguistics. (Year: 2015).*

Radhakrishnan et al., "ELDEN: Improved Entity Linking using Densified Knowledge Graphs", Proceedings of NAACL-HLT 2018, pp. 1844-1853 New Orleans, Louisiana, Jun. 1-6, 2018. 2018 Association for Computational Linguistics (Year: 2018).*

Fedorenko, D. et al., "Automatic recognition of domain-specific terms: an experimental evaluation." Proceedings of the Institute for System Programming, 2014, pp. 55-71, vol. 26, issue 4, Russia.

Dobrov, B., et al., "Multiple evidence for term extraction in broad domains." Proceedings of the international conference recent advances in natural language processing, Sep. 12-14, 2011, pp. 710-715, Hissar, Bulgaria.

Frantzi, K. et al., "Automatic recognition of multi-word terms: the C-value/NC-value method." International journal on digital libraries, 2000, pp. 115-130, Springer-Verlag, Berlin, Heidelberg.

Giuliano, C. et al. "Acquiring thesauri from Wikis by exploiting domain models and lexical substitution." Extended Semantic Web Conference, 2010, pp. 121-135, Springer, Berlin, Heidelberg.

Knoth, P. et al., "Towards a framework for comparing automatic term recognition methods." http://code.google.com/p/jajatr/, 2009, pp. 1-13, Open Research Online, United Kingdom.

Ventura, J.A.L., et al. "Biomedical Terminology Extraction: A new combination of Statistical and Web Mining Approaches." Journal of International Days of Statistical Analysis of Textual Data, Jun. 2, 2014, pp. 421-432, France.

Weichselbraun, A., et al., "Evidence Sources, Methods and Use Cases for Learning Lightweight Domain Ontologies", Faculty of Engineering, Science and Mathematics, 2011, pp. 1-15, IGI Global, United States.

Mell et al., "The NIST Definition of Cloud Computing," National Institute of Standards and Technology Special Publication 800-145, Sep. 2011, 7 pages, United States.

Verberne, S., et al., "Evaluation and analysis of term scoring methods forterm extraction," Information Retrieval Journal, 2016, pp. 510-545, vol. 19, No. 5, Springer, Berlin, Heidelberg.

Zhang, Z., et al., "JATE 2.0: Java automatic term extraction with Apache Solr," Proceedings of the Tenth International Conference on Language Resources and Evaluation, May 2016, pp. 2262-2269, United States.

Astrakhantsev, N., "Methods and software for terminology extraction from domain specific text collection," Ph.D. thesis, Institute for System Programming of Russian Academy of Sciences, Mar. 5, 2015, pp. 1-148, Russia.

Bordea, G., et al., "Domain-independent term extraction through domain modelling," in: Proc. of the Conference on Terminology and Artificial Intelligence, Sep. 11, 2013, pp. 1-8, Paris, France.

Rose, S., et al., "Automatic keyword extraction from individual documents," Text Mining: Applications and Theory, 2010, John Wiley & Sons LTD., United States {Abstract Only}.

Sclano, F., et al., "Term Extractor: a web application to learn the shared terminology of emergent web communities." In Enterprise Interoperability II, Oct. 8-9, 2007, pp. 287-290, Springer, London.

(56) References Cited

OTHER PUBLICATIONS

Matsuo, Y., et al., "Keyword extraction from a single document using word co-occurrence statistical information," International Journal on Artificial Intelligence Tools, Mar. 2004, pp. 392-396, vol. 13, No. 1, aaai.org, United States.

Park, Y., et al., "Automatic glossary extraction: Beyond terminology identification," in: Proc. of COLING'02, Association for Computational Linguistics, 2002, pp. 1-7, United States.

Ananiadou, S., "A methodology for automatic term recognition." Proc. of COLING1994, 1994, pp. 1034-1038, ACL, Stroudsburg, PA, United States.

Church, K.W. et al., "Poisson mixtures." Natural Language Engineering, Jun. 1995, pp. 163-190, vol. 1, No. 2, United States.

Bourigault, D., "Surface grammatical analysis for the extraction of terminological noun phrases." In 14th International Conference on Computational Linguistics (COLING 92), 1992, pp. 977-981, ACM, United States.

Ahmad, K., et al., "Weirdness indexing for logical document extrapolation and retrieval." In The Eighth Text Retrieval Conference, 1999, pp. g1-g8, University of Surrey, United Kingdom.

\* cited by examiner

DISCOVERING RANKED DOMAIN RELEVANT TERMS USING KNOWLEDGE

BACKGROUND

The field of embodiments of the invention generally relate to natural language processing (NLP).

NLP is a field of artificial intelligence concerned with interaction and understanding between computers and human languages, including programming of computers to process and analyze large amounts of natural language data, and derive meaning from human languages in a smart and useful way. Examples of NLP tasks include, but are not limited to, creation of domain knowledge graphs, taxonomies, search, translation, standardization, etc.

Conventional approaches to terminology ranking are primarily based on term-based metrics, such as term frequencies (i.e., terms are ranked in accordance with a number of times each term occurs in a corpus). Such approaches are effective if terminology is extracted from a corpus comprising a large volume of text to have a good distribution of terms across the corpus (i.e., relevant terms occur in the large corpus with high frequency). Using such approaches to rank terms in terminology extracted from a relatively small corpus of documents is ineffective as there may be very low frequencies for relevant terms. For example, a term describing a specific model of a video card may occur only in a configuration section of a small corpus of technical documents (e.g., technical troubleshooting documents). There is need for a method and system that addresses corpora where relevant terms appear with low frequencies.

SUMMARY

Embodiments of the invention generally relate to natural language processing (NLP), and more specifically, to a method and system for discovering ranked domain relevant terms using knowledge.

One embodiment of the invention provides a method for terminology ranking for use in NLP. The method comprises receiving a list of terms extracted from a corpus, where the list comprises a ranking of the terms based on frequencies of the terms across the corpus. The method further comprises accessing a domain ontology associated with the corpus, and re-ranking the list based on the domain ontology. The resulting re-ranked list comprises a different ranking of the terms based on relevance of the terms using knowledge from the domain ontology. The method further comprises generating clusters of terms via a trained model adapted to the corpus, and boosting a rank of at least one term of the re-ranked list based on the clusters to increase a relevance of the at least one term using knowledge from the trained model. Other embodiments include a system for terminology ranking for use in NLP and a computer program product for terminology ranking for use in NLP. These features contribute to the advantage of providing a terminology ranking solution that is suitable for corpora where relevant terms appear with very low frequency (i.e., the solution caters to terms that occur less frequently in a domain). These features also contribute to the advantage of providing a terminology ranking solution that combines both knowledge from the domain ontology and knowledge from the trained model to rank the terms based on relevance of the terms.

One or more of the following features may be included.

In some embodiments, a text embedding technique is applied to the corpus to obtain the trained model. In some embodiments, the domain ontology is accessed by loading a generic domain ontology as a knowledge graph, mapping the terms extracted from the corpus to entities of the knowledge graph, identifying a subgraph of the knowledge graph with a highest density of terms mapped to entities, and extracting the subgraph identified as the domain ontology. These optional features contribute to the advantage of re-ranking and/or boosting the terms using knowledge from a specific domain ontology associated with the corpus and/or knowledge from a trained model adapted to the corpus.

In some embodiments, the list is re-ranked by linking a term of the list to an entity of the domain ontology, and boosting a rank of the term and one or more aliases of the term. In some embodiments, the list is re-ranked by determining a first set of scores based on semantic relations and a second set of scores based on network metrics using the knowledge from the domain ontology, aggregating the first set of scores and the second set of scores to determine a final score, and re-ranking the list in accordance with the final score. These optional features contribute to the advantage of discovering ranked domain relevant terms using knowledge from the domain ontology.

In some embodiments, a rank of a term is boosted by selecting a cluster from the clusters that contains the term, determining a percentage of one or more other terms included in the cluster selected that have higher ranks in the list than a current rank of the term in the list, determining whether the percentage satisfies a pre-determined condition, and selectively boosting a rank of at least one term of the cluster selected that has a lower rank in the list than the current rank in response to determining the percentage satisfies the pre-determined condition. This optional feature contributes to the advantage of boosting similar terms in clusters that already have a high percentage of higher ranked terms using knowledge from the trained model.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

Figure 1:
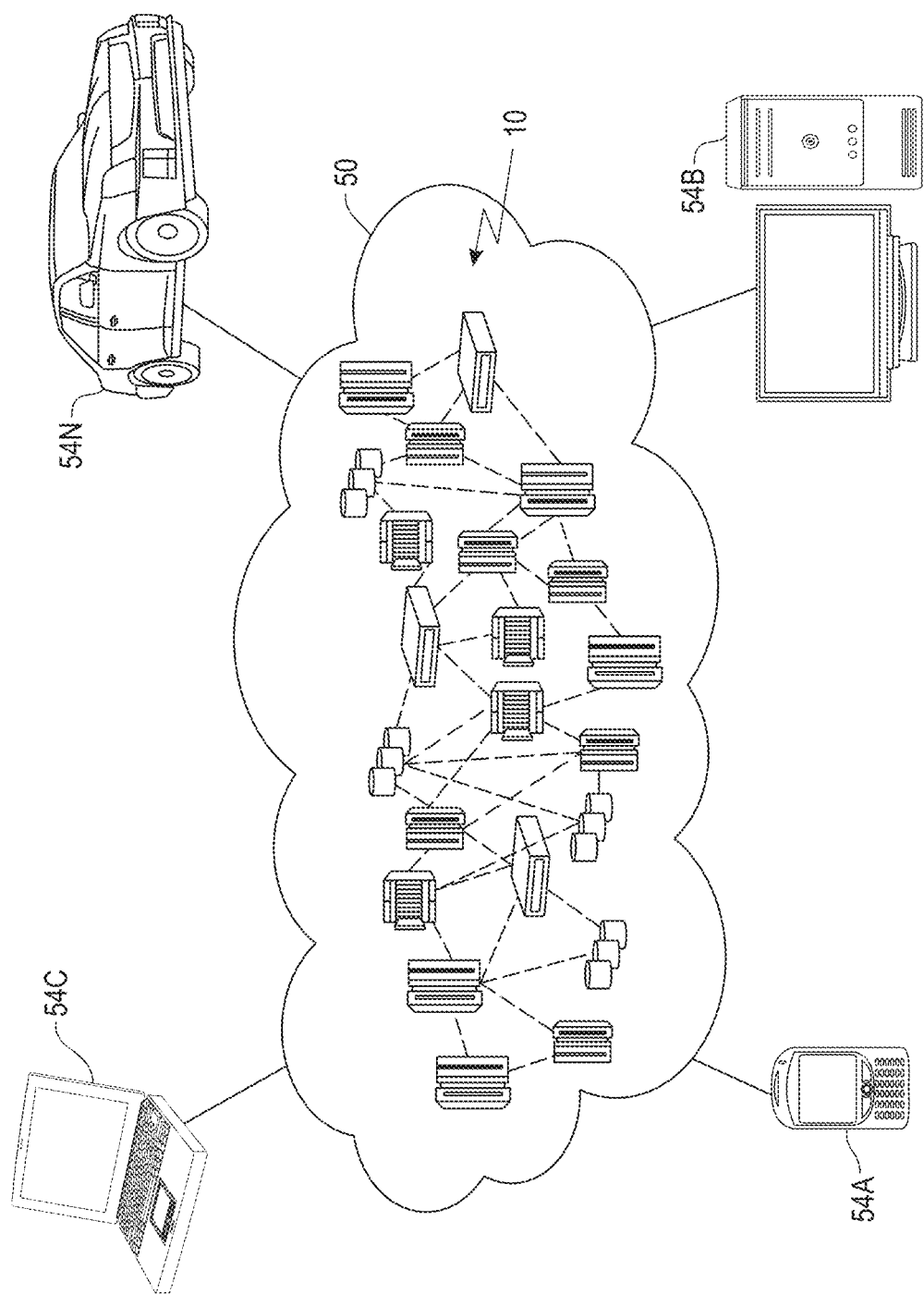
FIG. 1 depicts a cloud computing environment according to an embodiment of the present invention.

The detailed description explains the preferred embodiments of the invention, together with advantages and features, by way of example with reference to the drawings.

DETAILED DESCRIPTION

Embodiments of the invention generally relate to natural language processing (NLP), and more specifically, to a method and system for discovering ranked domain relevant terms using knowledge. One embodiment of the invention provides a method for terminology ranking for use in NLP. The method comprises receiving a list of terms extracted from a corpus, where the list comprises a ranking of the terms based on frequencies of the terms across the corpus. The method further comprises accessing a domain ontology associated with the corpus, and re-ranking the list based on the domain ontology. The resulting re-ranked list comprises a different ranking of the terms based on relevance of the terms using knowledge from the domain ontology. The method further comprises generating clusters of terms via a trained model adapted to the corpus, and boosting a rank of at least one term of the re-ranked list based on the clusters to increase a relevance of the at least one term using knowledge from the trained model.

Another embodiment of the invention provides a system for terminology ranking for use in NLP. The system comprises at least one processor, and a non-transitory processor-readable memory device storing instructions that when executed by the at least one processor causes the at least one processor to perform operations. The operations include receiving a list of terms extracted from a corpus, where the list comprises a ranking of the terms based on frequencies of the terms across the corpus. The operations further include accessing a domain ontology associated with the corpus, and re-ranking the list based on the domain ontology. The resulting re-ranked list comprises a different ranking of the terms based on relevance of the terms using knowledge from the domain ontology. The operations further include generating clusters of terms via a trained model adapted to the corpus, and boosting a rank of at least one term of the re-ranked list based on the clusters to increase a relevance of the at least one term using knowledge from the trained model.

One embodiment of the invention provides a computer program product for terminology ranking for use in NLP. The computer program product comprises a computer readable storage medium having program instructions embodied therewith, the program instructions executable by a processor to cause the processor to receive a list of terms extracted from a corpus, where the list comprises a ranking of the terms based on frequencies of the terms across the corpus. The program instructions are further executable by the processor to cause the processor to access a domain ontology associated with the corpus, and re-rank the list based on the domain ontology. The resulting re-ranked list comprises a different ranking of the terms based on relevance of the terms using knowledge from the domain ontology. The program instructions are further executable by the processor to cause the processor to generate clusters of terms via a trained model adapted to the corpus, and boost a rank of at least one term of the re-ranked list based on the clusters to increase a relevance of the at least one term using knowledge from the trained model.

Terminology refers to a group of words or meanings relating to a particular field and extracted from a corpus. Terminology can be used for conceptualizing a knowledge domain. Terminology is useful in many downstream NLP tasks such as, but not limited to, creation of domain knowledge graphs, taxonomies, search, translation, standardization, etc.

Terminology ranking involves ranking terms in a terminology extracted from a corpus, resulting in a ranked list of terms. Many tasks require showing a user a ranked list of terms. The ranked list of terms may comprise a pre-determined number of terms for purposes of usability, productivity, etc. As a result, potential issues that may arise include manual curation of taxonomies, showing a limited number of facets, etc. There is need for a method and system that can rank terms in a terminology with high relevance.

Embodiments of the invention provide a method and system for terminology ranking that is suitable for corpora where relevant terms appear with very low frequency. Embodiments of the invention can be bootstrapped to conventional solutions as a means of post-processing using knowledge representations to cater to terms that occur less frequently in a domain.

Embodiments of the invention provide a framework for improved terminology ranking. In one embodiment, the framework is configured to: (1) receive a ranked list of terms extracted from a corpus (e.g., a ranked list of terms generated using a conventional approach, such as c-value, glossEx, etc.), and (2) perform post-processing on the ranked list by re-ranking and/or term boosting (i.e., increasing relevancy of a term by improving a rank of the term) the ranked list based on a domain ontology associated with the corpus (e.g., Information Technology (IT) ontology, Wikidata™, etc.) and/or a trained model (i.e., term embedding model, type embedding model, or topic model) adapted to the corpus. For example, if the framework determines that one or more terms of the ranked list can be linked to the domain ontology, the frameworks re-ranks the one or more terms to reflect that the one or more terms are more relevant (e.g., the one or more terms are ranked higher in the re-ranked list). As another example, if the framework determines that one or more terms of the ranked list are similar to a number of already highly ranked terms of the ranked list based on the trained model, the frameworks re-ranks the one or more terms to reflect that the one or more terms are more relevant (e.g., the one or more terms are ranked higher in the re-ranked list).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
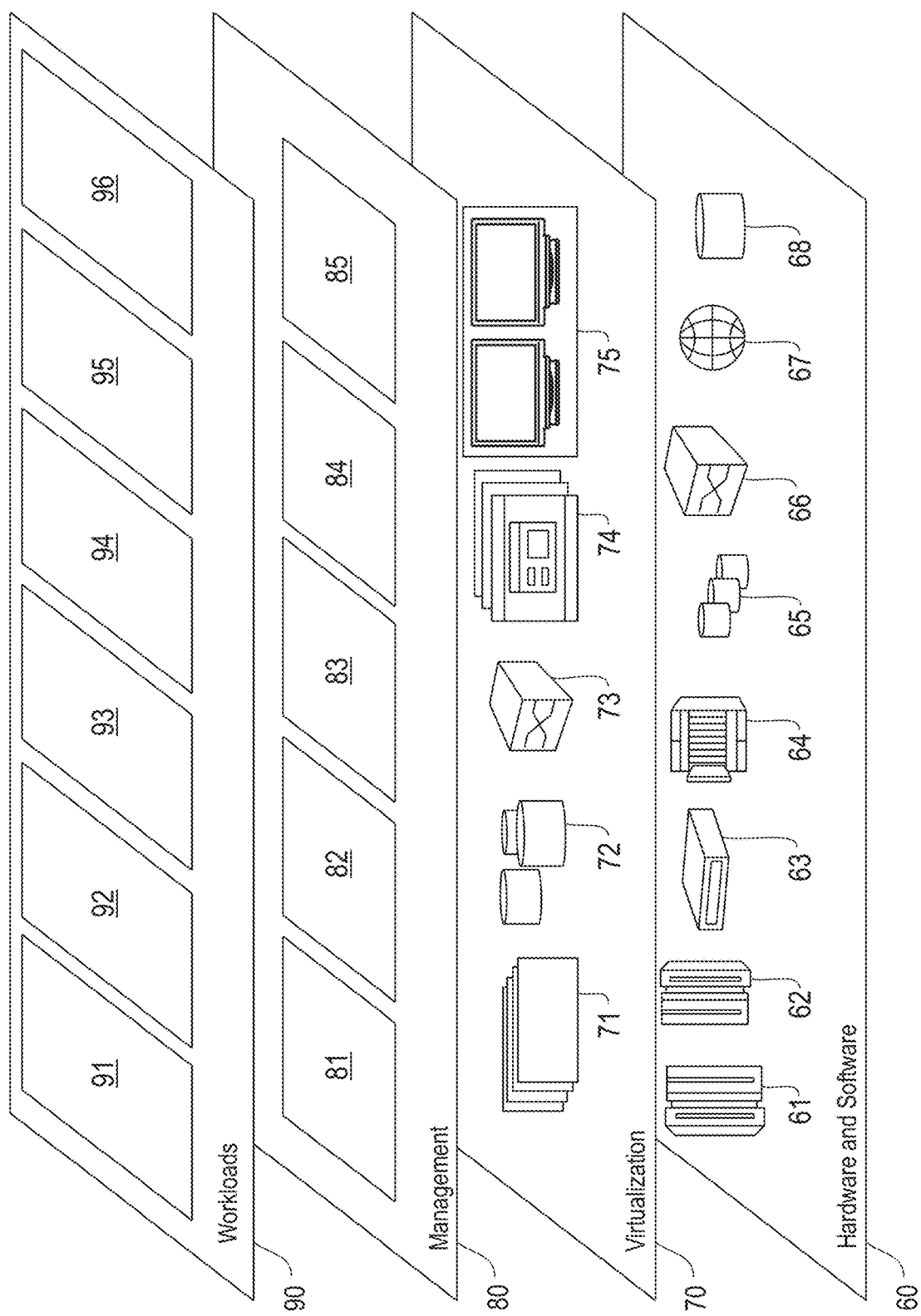
FIG. 2 depicts abstraction model layers according to an embodiment of the present invention.

FIG. 2 depicts a set of functional abstraction layers provided by cloud computing environment 50 according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and terminology ranking 96 (e.g., a terminology ranking system 330, as described in detail later herein).

Figure 3:
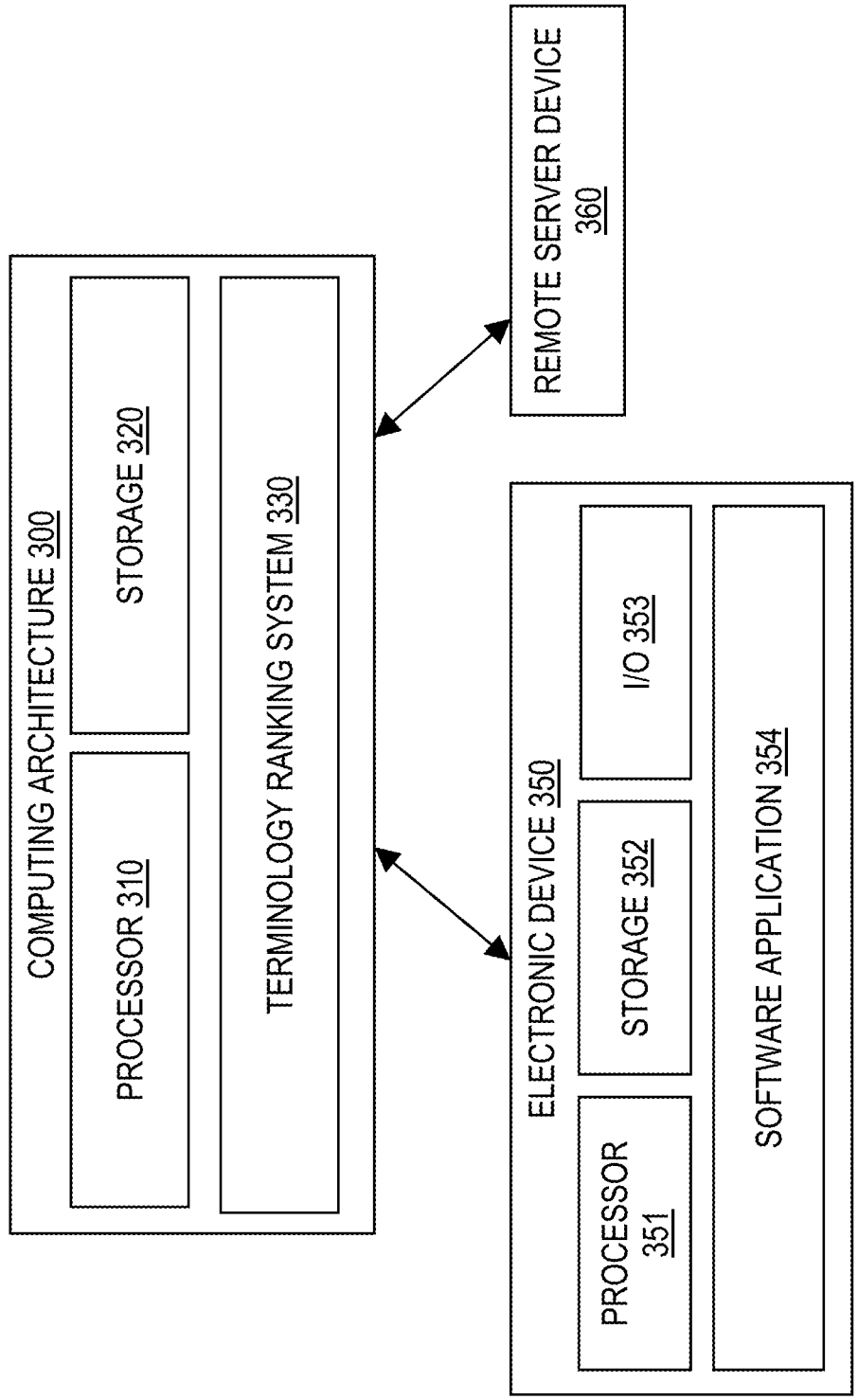
FIG. 3 illustrates an example computing architecture for discovering ranked domain relevant terms using knowledge, in accordance with an embodiment of the invention.

FIG. 3 illustrates an example computing architecture 300 for discovering ranked domain relevant terms using knowledge, in accordance with an embodiment of the invention. In one embodiment, the computing architecture 300 is a centralized computing architecture. In another embodiment, the computing architecture 300 is a distributed computing architecture.

In one embodiment, the computing architecture 300 comprises computation resources such as, but not limited to, one or more processor units 310 and one or more storage units 320. One or more applications may execute/operate on the computing architecture 300 utilizing the computation resources of the computing architecture 300. In one embodiment, the applications on the computing architecture 300 include, but are not limited to, a terminology ranking system 330 configured to discover ranked domain relevant terms using knowledge. As described in detail later herein, the terminology ranking system 330 is configured to: (1) receive a corpus (e.g., text corpus) comprising one or more corpus documents, (2) obtain (i.e., access) a corresponding terminology of the corpus, wherein the corresponding terminology comprises terms extracted from the corpus, (3) obtain a first ranked list comprising a ranking of the terms based on term frequencies, (4) generate a second ranked list comprising a re-ranking of the terms based on domain ontology, and (5) boost a rank of at least one term (i.e., increase relevancy) of the second ranked list based on a trained model (i.e., term embedding model, type embedding model, or topic model) adapted to the corpus, resulting in a third ranked list of the terms that includes one or more terms that have been re-ranked and/or boosted.

Examples of corpus documents include, but are not limited to, IT documents relating to one or more IT areas (e.g., services, database, storage, hardware, etc.), legal documents, intellectual property (IP) documents, healthcare documents, review documents, text publications, corporate documents, etc. Examples of IT documents include, but are not limited to, technical troubleshooting documents, tickets, logs, etc. Examples of legal documents include, but are not limited to, agreements, contracts, deeds, wills, certificates, bills of sale, legislative acts, etc. Examples of IP documents include, but are not limited to, patent registrations, trademark registrations, copyright registrations, and any type of legal document relating to protection of IP, such as non-disclosure agreements, license agreements, etc. Examples of healthcare documents include, but are not limited to, medical records, billing records, health care directives, etc. Examples of review documents include, but are not limited to, reviews of publications (e.g., books), services (e.g., restaurants), companies (e.g., retail stores), products (e.g., cars), performances (e.g., movies), events (e.g., concerts), etc. Examples of text publications include, but are not limited to, newspapers, journals, scientific articles, books, white papers, encyclopedias, etc. Examples of corporate documents include, but are not limited to, meeting minutes, articles of incorporation, corporate bylaws, employee documents, etc.

In one embodiment, the terminology ranking system 330 is configured to exchange data with one or more electronic devices 350 and/or one or more remote server devices 360 over a connection (e.g., a wireless connection such as a Wi-Fi connection or a cellular data connection, a wired connection, or a combination of the two).

In one embodiment, an electronic device 350 comprises one or more computation resources such as, but not limited to, one or more processor units 351 and one or more storage units 352. One or more applications may execute/operate on an electronic device 350 utilizing the one or more computation resources of the electronic device 350 such as, but not limited to, one or more software applications 354 loaded onto or downloaded to the electronic device 350. Examples of software applications 354 include, but are not limited to, artificial intelligence (AI) applications, NLP applications, etc.

Examples of an electronic device 350 include, but are not limited to, a desktop computer, a mobile electronic device (e.g., a tablet, a smart phone, a laptop, etc.), a wearable device (e.g., a smart watch, etc.), an Internet of Things (IoT) device, a smart appliance such as a smart television, etc.

In one embodiment, an electronic device 350 comprises one or more input/output (I/O) units 353 integrated in or coupled to the electronic device 350, such as a keyboard, a keypad, a touch interface, a display screen, etc. A user may utilize an I/O module 353 of an electronic device 350 to configure one or more user preferences, configure one or more parameters (e.g., validation properties, thresholds, etc.), provide input, etc.

In one embodiment, an electronic device 350 and/or a remote server device 360 may be a source of at least one of the following: a domain ontology, one or more corpus documents, or a trained model.

In one embodiment, the terminology ranking system 330 may be accessed or utilized by one or more online services (e.g., AI services, NLP services) hosted on a remote server device 360 and/or one or more software applications 354 (e.g., AI applications, NLP applications) operating on an electronic device 350. For example, in one embodiment, a virtual assistant, a search engine, or another type of software application 354 operating on an electronic device 350 can invoke the system 330 to perform an NLP task.

Figure 4:
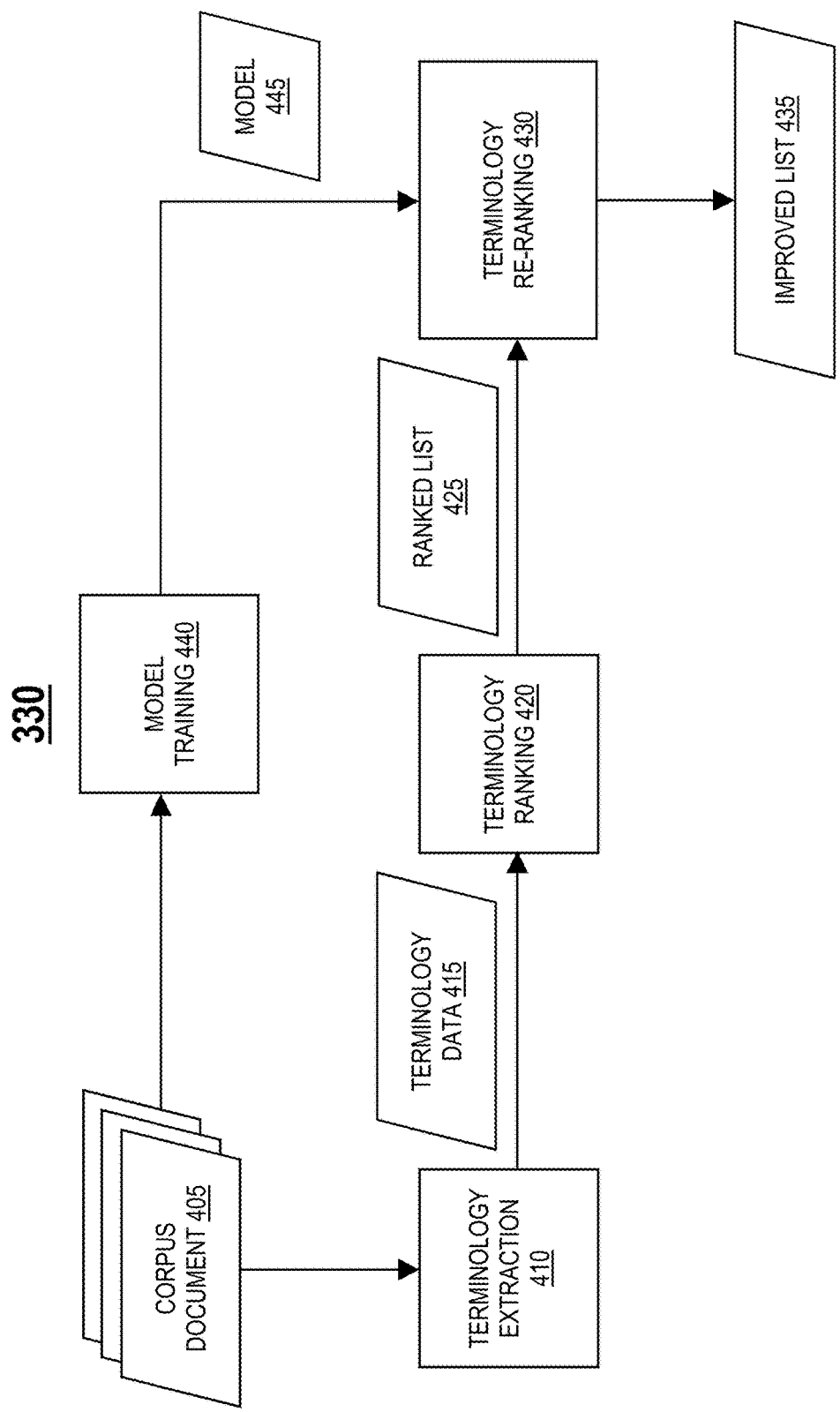
FIG. 4 illustrates an example terminology ranking system, in accordance with an embodiment of the invention.

FIG. 4 illustrates an example terminology ranking system 330, in accordance with an embodiment of the invention. In one embodiment, the system 330 optionally comprises a terminology extraction system 410 configured to: (1) receive a corpus (e.g., text corpus) comprising one or more corpus documents 405 (e.g., IT documents), (2) extract one or more terms from the corpus documents 405, and (3) generate terminology data 415 comprising a terminology of the corpus. In one embodiment, the terminology data 415 comprises the terms extracted from the corpus documents 405 and corresponding term frequencies. For each term extracted from the corpus documents 405, the terminology data 415 comprises a corresponding term frequency (e.g., c-value measure, glossEx measure, etc.) representing a number of times the term occurs across the corpus documents 405.

In one embodiment, the system 330 optionally comprises a terminology ranking unit 420 configured to: (1) receive terminology data 415 comprising a terminology of a corpus (e.g., from the terminology extraction system 410), and (2) generate, based on the terminology data 415, a ranked list 425 comprising a ranking of terms extracted from the corpus, wherein the ranking is based on term frequencies.

In one embodiment, the system 330 optionally comprises a model training unit 440 configured to: (1) receive a corpus (e.g., text corpus) comprising one or more corpus documents 405 (e.g., IT documents), and (2) perform model training based on the corpus, resulting in a trained model 445 adapted to the corpus. In one embodiment, the model training comprises applying a text embedding technique to the corpus to learn/train term embeddings, such that the resulting trained model 445 is a term embedding model (i.e., type embedding model or topic model). For example, in one embodiment, the model training unit 440 applies a text embedding technique such as, but not limited to, Word2Vec.

In one embodiment, the system 330 comprises a terminology re-ranking system 430 configured to: (1) receive a ranked list 425 comprising a ranking of terms extracted from a corpus based on term frequencies (e.g., from the terminology ranking unit 420), (2) receive a trained model 445 adapted to the corpus (e.g., from the model training unit 440), (3) perform re-ranking to re-rank at least one term of the ranked list 425 based on a domain ontology associated with the corpus, (4) perform boosting to boost a rank of at least one term of the ranked list 425 based on the trained model 445, and (5) generate, based on the re-ranking and the boosting, an improved list 435 comprising an updated ranking of terms extracted from the corpus. In one embodiment, the ranking of the terms included in the improved list 435 comprises at least one term that has been re-ranked based on the domain ontology and/or at least one term with a rank boosted based on the trained model 445. Unlike the ranked list 425 where ranks of terms are based on term frequencies, ranks of terms included in the improved list 435 are based on term relevance (i.e., importance of terms in the domain specific to the corpus). The terminology re-ranking system 430 discovers ranked domain relevant terms using knowledge (i.e., the domain ontology and the trained model 445).

Figure 5:
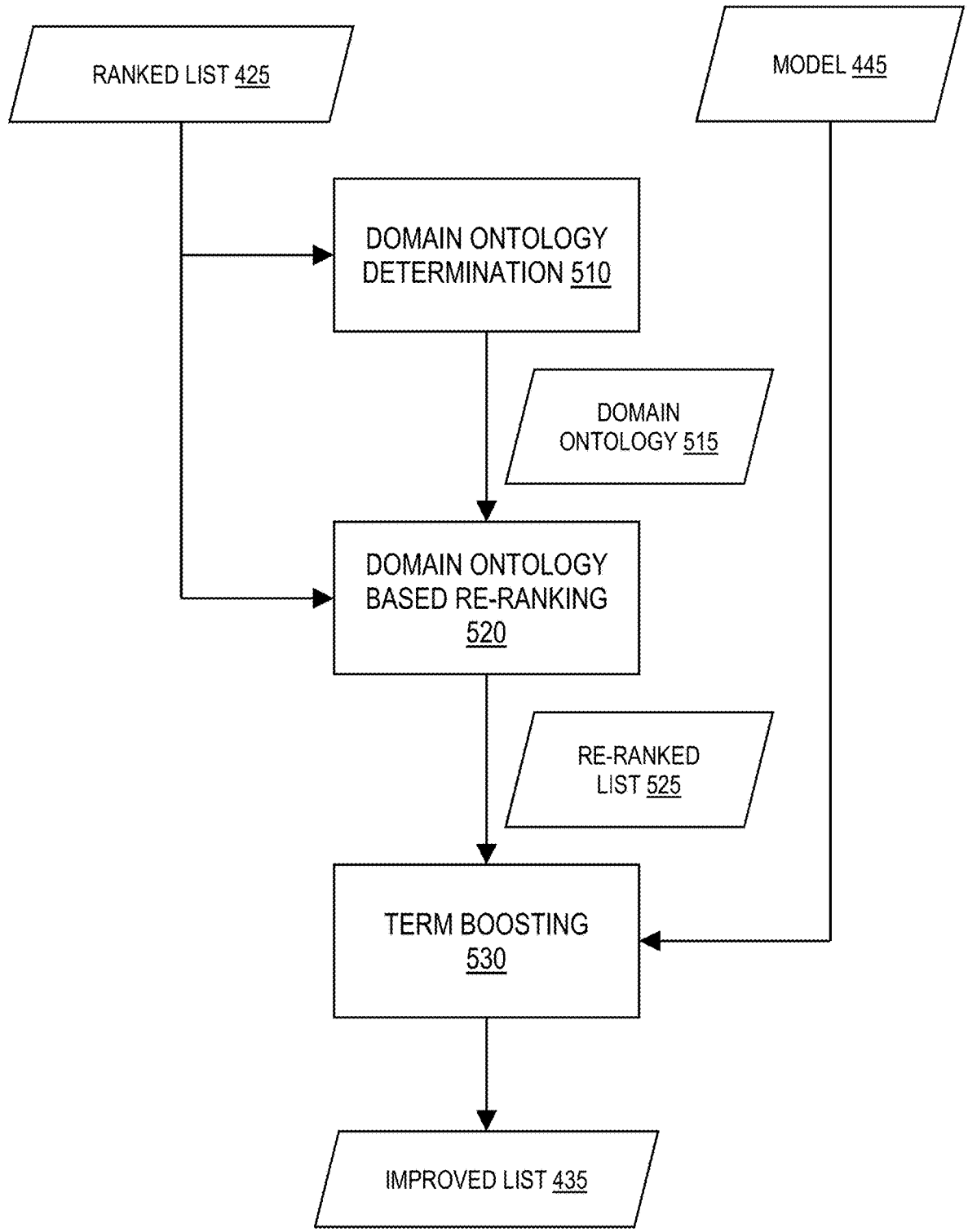
FIG. 5 illustrates an example terminology re-ranking system, in accordance with an embodiment of the invention.

FIG. 5 illustrates an example terminology re-ranking system 430, in accordance with an embodiment of the invention. In one embodiment, the system 430 comprises a domain ontology determination unit 510 configured to: (1) receive a ranked list 425 comprising a ranking of terms extracted from a corpus based on term frequencies (e.g., from the terminology ranking unit 420), and (2) obtain (i.e., access) a domain ontology 515 associated with the corpus (i.e., a specific domain ontology or a domain-specific ontology that is specific to the corpus).

In one embodiment, if an existing (i.e., pre-existing) domain ontology is available, the domain ontology determination unit 510 is configured to use the existing domain ontology as the domain ontology 515. Examples of existing domain ontologies include, but are not limited to, IT ontology, Wikidata™, Linked Open Vocabularies, etc.

In another embodiment, the domain ontology determination unit 510 is configured to create the domain ontology 515 by: (1) loading a generic (i.e., general) domain ontology (e.g., Wikidata™) as a knowledge graph, (2) mapping terms extracted from the corpus to entities of the knowledge graph (i.e., identifying all entities in the knowledge graph that appear as terms in the corpus documents 405), (3) identifying a subgraph of the knowledge graph with the highest density of terms mapped to entities, and (4) extracting the subgraph identified as the domain ontology 515. The domain ontology 515 is a specific domain ontology (i.e., domain-specific ontology) that is adapted or customized to the corpus.

In one embodiment, the system 430 comprises a domain ontology based re-ranking unit 520 configured to: (1) receive a ranked list 425 comprising a ranking of terms extracted from a corpus based on term frequencies (e.g., from the terminology ranking unit 420), (2) receive a domain ontology 515 associated with the corpus (e.g., from the domain ontology determination unit 510), and (3) perform re-ranking to re-rank at least one term of the ranked list 425 based on the domain ontology 515, resulting in a re-ranked list 525 comprising an updated ranking of terms extracted from the corpus. Unlike the ranked list 425 where ranks of terms are based on term frequencies, ranks of terms included in the re-ranked list 525 are based on term relevance using knowledge from the domain ontology 515.

As described in detail later herein, in one embodiment, the re-ranking comprises linking at least one term of the ranked list 425 to an entity of the domain ontology 515, and boosting a rank of the term and one or more aliases of the term, if any. An alias of a term is another known or more familiar name/term/word that the term is also known by. For example, the term "OS" is an example alias of the term "operating system", the terms "hard disk", "hard drive", and "hard disk drive" are examples aliases of the term "hdd", etc.

As described in detail later herein, in another embodiment, the re-ranking comprises determining, using knowledge from the domain ontology 515, scores based on semantic relations and scores based on network metrics, and aggregating all the scores to determine a final score used to re-rank the ranked list 425.

In one embodiment, the system 430 comprises a term boosting system 530 configured to: (1) receive a re-ranked list 525 comprising an updated ranking of terms extracted from a corpus based on a domain ontology 515 associated with the corpus (e.g., from the domain ontology based re-ranking unit 520), (2) receive a trained model 445 adapted to the corpus (e.g., from the model training unit 440), and (3) perform boosting to boost a rank of at least one term of the re-ranked list 525 based on the trained model 445, resulting in an improved list 435 comprising a further updated ranking of terms extracted from the corpus based on both the domain ontology 515 and the trained model 445. In one embodiment, the ranking of the terms included in the improved list 435 comprises at least one term that has been re-ranked based on the domain ontology (e.g., via the domain ontology based re-ranking unit 520) and at least one term with a rank boosted based on the trained model 445 (e.g., via the term boosting system 530). Unlike the ranked list 425 where ranks of terms are based on term frequencies, ranks of terms included in the improved list 435 are based on term relevance using knowledge from the domain ontology 515 and the trained model 445.

Figure 6:
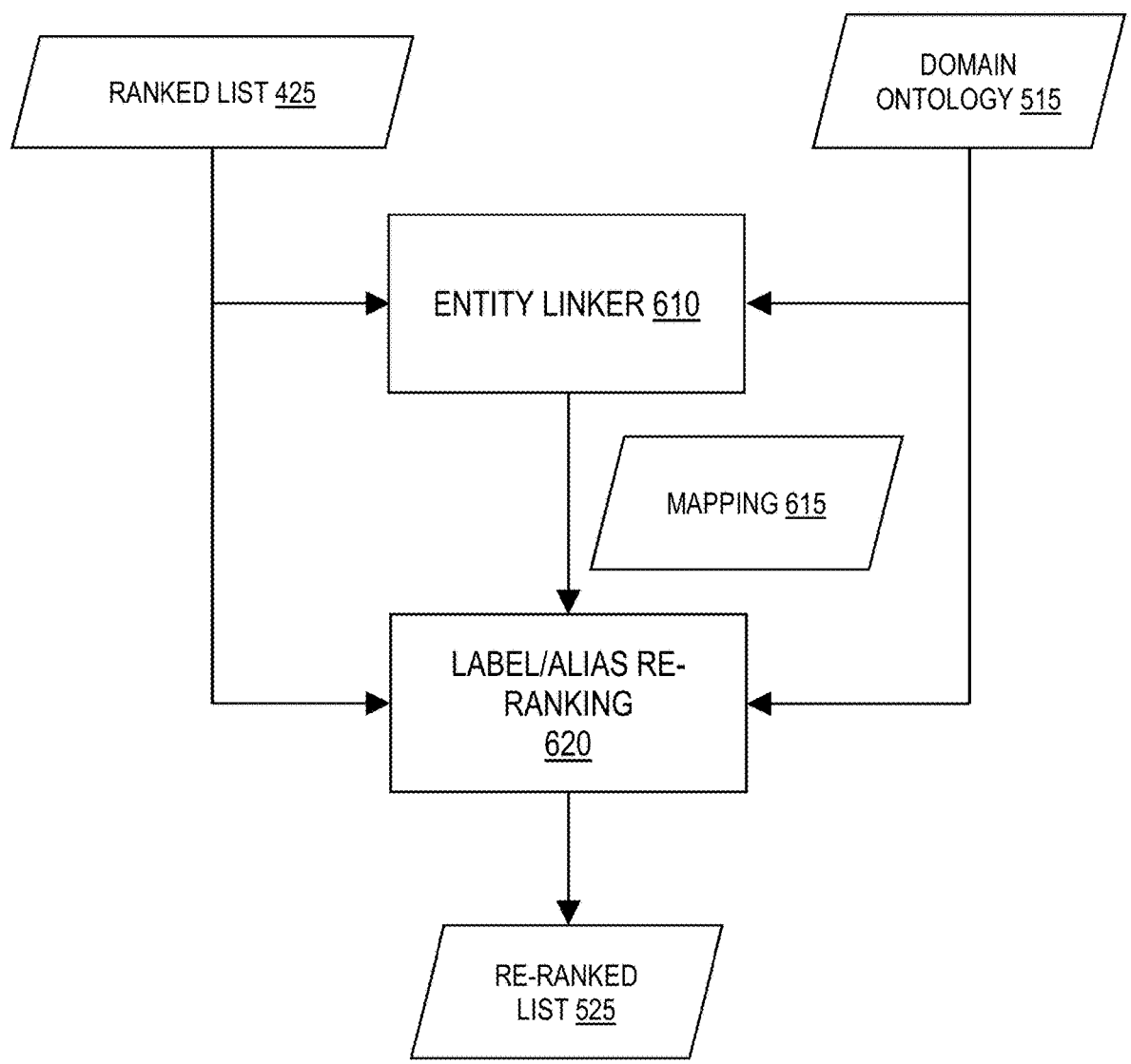
FIG. 6 illustrates an example domain ontology based re-ranking system, in accordance with an embodiment of the invention.

FIG. 6 illustrates an example domain ontology based re-ranking system 600, in accordance with an embodiment of the invention. In one embodiment, the domain ontology based re-ranking system 520 of FIG. 5. is implemented as the domain ontology based re-ranking system 600.

In one embodiment, the domain ontology based re-ranking system 600 comprises an entity linker unit 610 configured to: (1) receive a ranked list 425 comprising a ranking of terms extracted from a corpus based on term frequencies (e.g., from the terminology ranking unit 420), (2) receive a domain ontology 515 associated with the corpus (e.g., from the domain ontology determination unit 510), and (3) generate a mapping 615 based on the ranked list 425 and the domain ontology 515, wherein the mapping 615 comprises a map of terms to entities. In one embodiment, to generate a mapping 615 based on a ranked list 425 and a domain ontology 515, the entity linker unit 610 is configured to, for each term of the ranked list 425, determine whether a corresponding entity for the term exists in the domain ontology 515, and link the term to the entity, if applicable. The mapping 615 comprises one or more mappings between one or more terms of the ranked list 425 and one or more entities of the domain ontology 515 that the one or more terms are linked to.

In one embodiment, the domain ontology based re-ranking system 600 comprises a label/alias re-ranking unit 620 configured to: (1) receive a ranked list 425 comprising a ranking of terms extracted from a corpus based on term frequencies (e.g., from the terminology ranking unit 420), (2) receive a domain ontology 515 associated with the corpus (e.g., from the domain ontology determination unit 510), (3) receive a mapping 615 comprising a map of one or more terms of the ranked list 425 to one or more entities of the domain ontology 515 (e.g., from the entity linker unit 610), and (4) perform boosting to boost, for each term of the mapping 615 that is linked to an entity, a rank of the term and one or more aliases of the term, if any, resulting in a re-ranked list 525 comprising an updated ranking of terms extracted from the corpus. The updated ranking of terms included in the re-ranked list 525 is based on the domain ontology 515.

Figure 7:
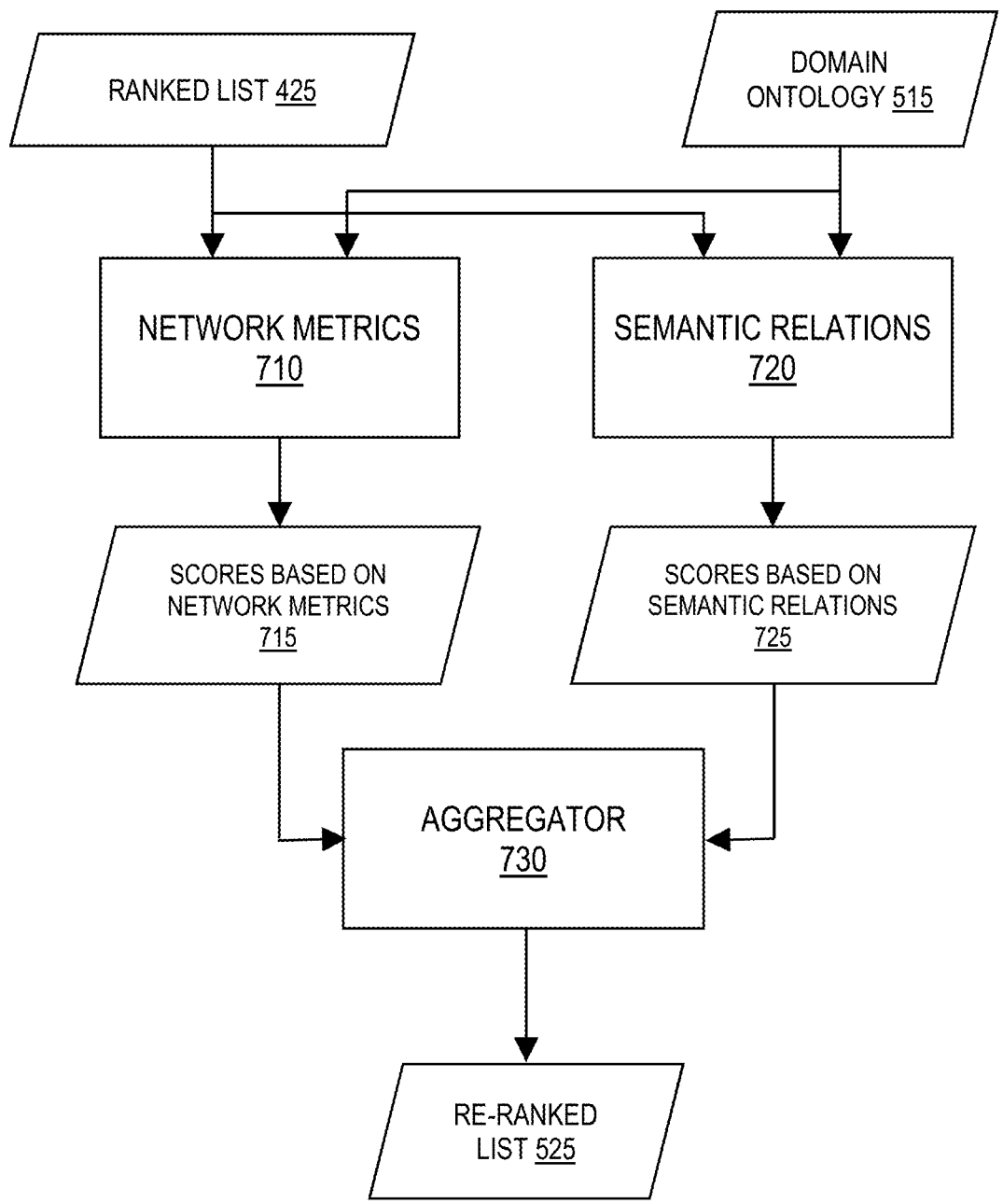
FIG. 7 illustrates another example domain ontology based re-ranking system, in accordance with an embodiment of the invention.

FIG. 7 illustrates another example domain ontology based re-ranking system 700, in accordance with an embodiment of the invention. In another embodiment, the domain ontology based re-ranking system 520 of FIG. 5 is implemented as the domain ontology based re-ranking system 700.

In one embodiment, the domain ontology based re-ranking system 700 comprises a network metrics unit 710 configured to: (1) receive a ranked list 425 comprising a ranking of terms extracted from a corpus based on term frequencies (e.g., from the terminology ranking unit 420), (2) receive a domain ontology 515 associated with the corpus (e.g., from the domain ontology determination unit 510), and (3) using existing knowledge from the domain ontology 515, apply one or more algorithms to the ranked list 524 to determine a set of scores 715 based on network metrics. In one embodiment, the set of scores 715 are based on network metrics such as, but not limited to, PageRank, in-degree centrality, out-degree centrality, betweenness centrality, eigenvector centrality, Katz centrality, other centrality based measures, etc.

In one embodiment, the domain ontology based re-ranking system 700 comprises a semantic relations unit 720 configured to: (1) receive a ranked list 425 comprising a ranking of terms extracted from a corpus based on term frequencies (e.g., from the terminology ranking unit 420), (2) receive a domain ontology 515 associated with the corpus (e.g., from the domain ontology determination unit 510), and (3) using existing knowledge from the domain ontology 515, apply one or more algorithms to the ranked list 524 to determine a corresponding set of scores 725 based on semantic relations. In one embodiment, the set of scores 725 are based on semantic relations such as, but not limited to, taxonomic relations, direct super classes and sub classes, entities in the domain ontology 515 connected with n edges, other relations in the domain ontology 515, etc.

In one embodiment, the domain ontology based re-ranking system 700 comprises an aggregator 730 configured to: (1) receive, for a ranked list 425 comprising a ranking of terms extracted from a corpus based on term frequencies, a corresponding set of scores 715 based on network metrics (e.g., from the network metrics unit 710), (2) receive, for the ranked list 425, a corresponding set of scores 725 based on semantic relations (e.g., from the semantic relations unit 720), (3) determine, for the ranked list 425, a corresponding final score by aggregating the corresponding sets of scores 715 and 725, and (4) re-ranking the ranked list 425 in accordance with the corresponding final score, resulting in a re-ranked list 525 comprising an updated ranking of terms extracted from the corpus. The updated ranking of terms included in the re-ranked list 525 is based on a domain ontology 515 associated with the corpus.

Figure 8:
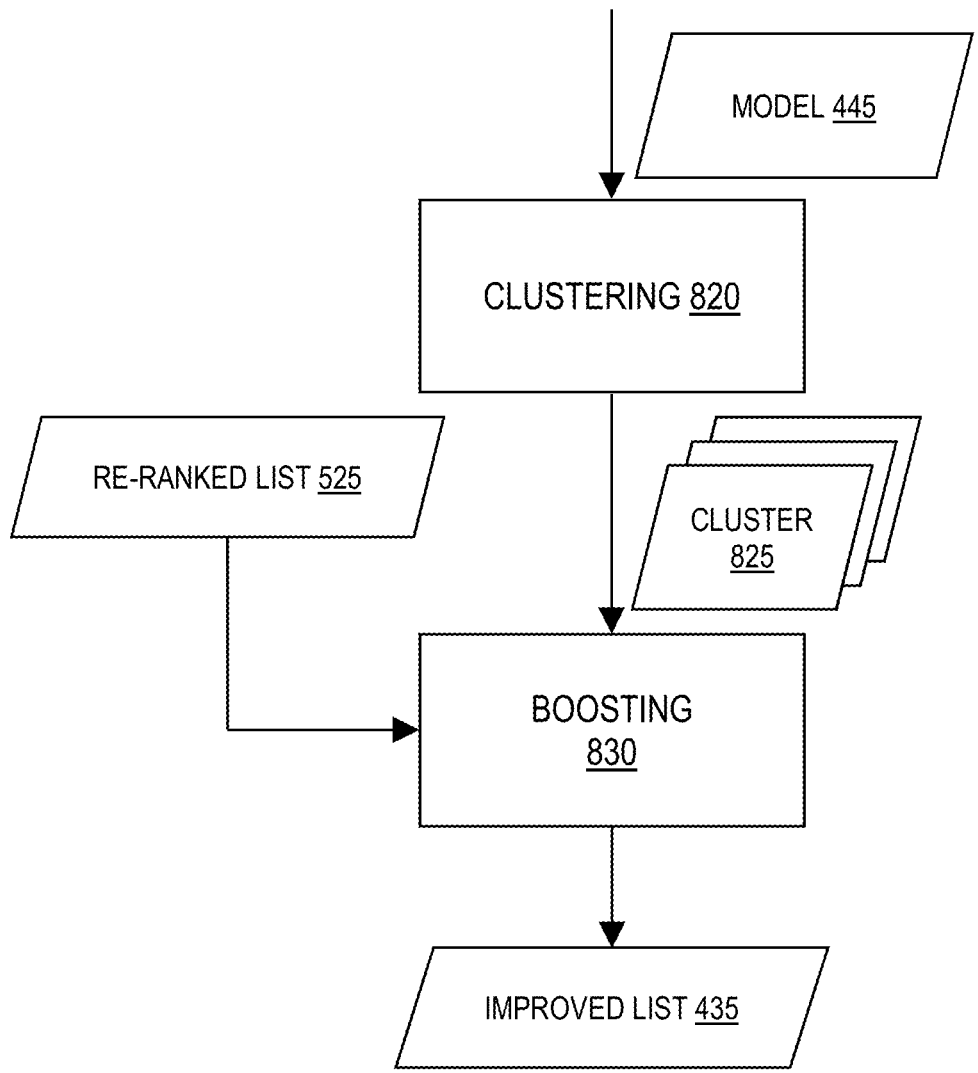
FIG. 8 illustrates an example term boosting system, in accordance with an embodiment of the invention.

FIG. 8 illustrates an example term boosting system 530, in accordance with an embodiment of the invention. In one embodiment, the term boosting system 530 comprises a clustering unit 820 configured to: (1) receive a trained model 445 adapted to a corpus (e.g., from the model training unit 440), and (2) perform clustering by applying the trained model 445 to a terminology of the corpus to generate one or more clusters 825 of terms, wherein each cluster 825 comprises a set of terms extracted from the corpus and clustered together based on term/type embeddings. The term boosting system 530 boosts similar terms by clustering using term embeddings.

In one embodiment, the term boosting system 530 comprises a boosting unit 830 configured to: (1) receive a re-ranked list 525 comprising an updated ranking of terms extracted from a corpus based on a domain ontology 515 associated with the corpus (e.g., from the domain ontology based re-ranking unit 520), (2) receive one or more clusters 825 of terms based on a trained model 445 adapted to the corpus(e.g., from the clustering unit 820), and (3) perform boosting to boost a rank of one or more terms of the ranked list 525 based on the one or more clusters 825, resulting in an improved list 435 comprising an updated ranking of terms extracted from the corpus. The updated ranking of terms included in the improved list 435 is based on both the domain ontology 515 and the trained model 445 adapted to the corpus.

In one embodiment, for each term x of the ranked list 525, the boosting unit 830 is configured to: (1) determine a current ranky of the term x in the ranked list 525, (2) obtain a cluster 825 containing the term x, (3) determine a percentage of other terms included in the same cluster 825 that have higher ranks in the ranked list 525 than the current ranky (i.e., higher ranked terms), (4) determine whether the percentage of higher ranked terms satisfies a first pre-determined condition (e.g., whether the percentage of higher ranked terms exceeds a first pre-determined threshold), and (5) in response to determining the percentage of higher ranked terms satisfies the pre-determined condition, boost a rank of at least one term of the cluster 825 to a new/updated rank that is based on the current ranky. In one embodiment, the boosting unit 830 is configured to boost a rank of at least one term of the cluster 825 to a new/updated rank that is based on the current ranky by: (1) obtaining other terms included in the same cluster 825 that have lower ranks in the ranked list 525 than the current ranky (i.e., lower ranked terms), and (2) for each lower ranked term, determine a cosine similarity between the lower ranked term and all higher ranked terms, and boost a rank of the lower ranked term to a new/updated rank (e.g., the current ranky plus 1) in response to determining the cosine similarity satisfies a second pre-determined condition (e.g., the cosine similarity exceeds a second pre-determined threshold). The boosting unit 830 boosts terms in clusters that already have a high percentage of higher ranked terms. In one embodiment, after the boosting, the term x remains in the resulting improved list 435 at the current ranky, and boosted terms (i.e., terms with new/updated ranks) are added to the improved list 435 after the term x.

Figure 9:
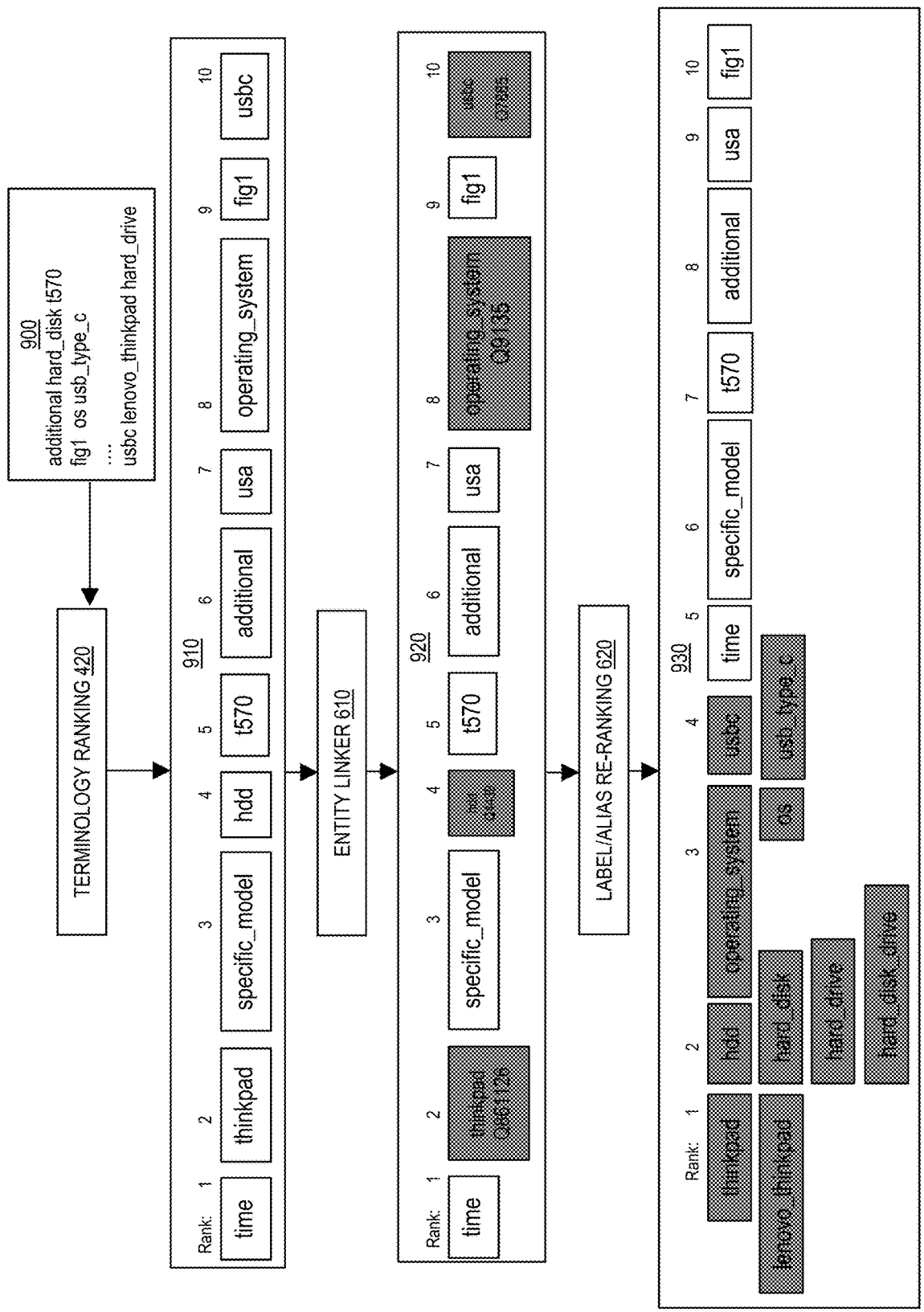
FIG. 9 illustrates an example workflow implemented by the terminology ranking system to re-rank terms extracted from a corpus based on a domain ontology associated with the corpus, in accordance with an embodiment of the invention.

FIG. 9 illustrates an example workflow implemented by the terminology ranking system 330 to re-rank terms extracted from a corpus based on a domain ontology associated with the corpus, in accordance with an embodiment of the invention. Assume the system 330 receives terminology data 900 comprising terms extracted from one or more IT documents. The system 330 is configured to rank, via the terminology ranking unit 420, the terms based on term frequencies across the IT documents, resulting in a first ranked list 910 comprising a first ranking of the terms.

The system 330 is configured to link, via the entity linker 610, at least one term of the first ranked list 910 to an entity in a domain ontology associated with the IT documents (e.g., IT ontology), resulting in a mapping 920 comprising, for each term of the first ranked list 910, a map of the term to an entity the term is linked to, if any. For example, as shown in FIG. 9, the terms "time", "specific_model", "t570", "additional", "usa", and "fig1" are not mapped to any entity, whereas the term "thinkpad" is mapped to the entity "Q861126", the term "hdd" is mapped to the entity "Q4439", the term "operating_system" is mapped to the entity "Q9135", and the term "usbc" is mapped to the entity "Q7865.".

The system 330 is configured to boost, via the label/alias re-ranking unit 620, a rank of each term of the mapping 920 that is linked to an entity and one or more aliases of the term, resulting in a second ranked list 930 comprising a new/updated ranking of terms extracted from the IT documents. As each of the terms "thinkpad", "hdd", "operating_system", and "usbc" is linked to a particular entity, a current rank of the term (and its aliases) is boosted to a higher rank. For example, as shown in FIG. 9, the term "thinkpad" (and its alias "lenovo_thinkpad") are boosted from its current rank of 2 (i.e., second) in the first ranked list 910/mapping 920 to a higher rank of 1 (i.e., first) in the second ranked list 930. As another example, as shown in FIG. 9, the term "hdd" (and its aliases "hard_disk", "hard_drive", and "hard-disk_drive") is boosted from its current rank of 4 (i.e., fourth) in the first ranked list 910/mapping 920 to a higher rank of 2 (i.e., second) in the second ranked list 930.

Figure 10:
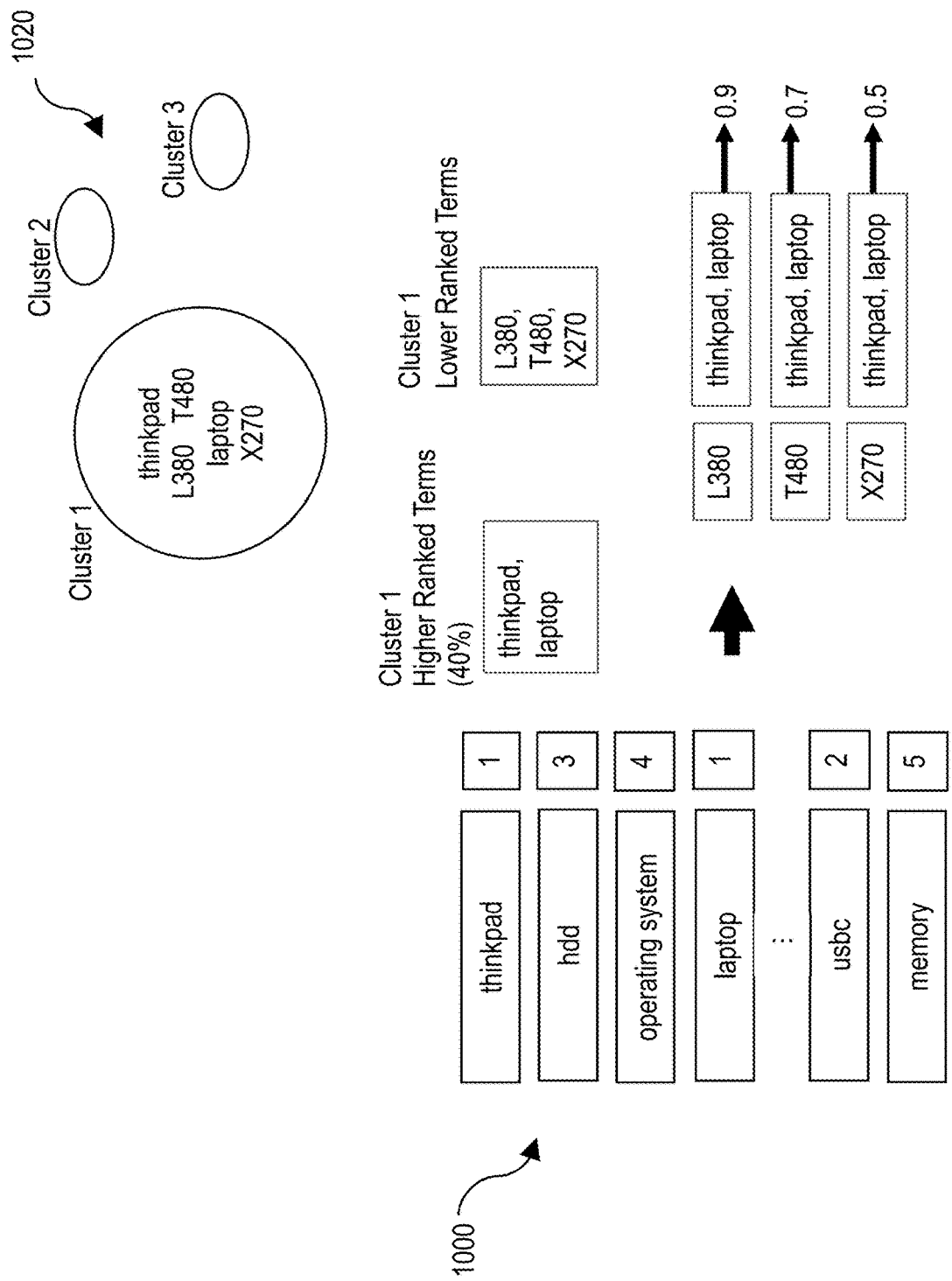
FIG. 10 illustrates an example workflow implemented by the terminology ranking system to re-rank terms extracted from a corpus based on a trained model adapted to the corpus, in accordance with an embodiment of the invention.

FIG. 10 illustrates an example workflow implemented by the terminology ranking system 330 to re-rank terms extracted from a corpus based on a trained model adapted to the corpus, in accordance with an embodiment of the invention. Assume the system 330 receives a ranked list 1000 comprising a ranking of terms extracted from one or more IT documents (e.g., a re-ranked list 525 from the domain ontology based re-ranking system 520) and clusters 1020 of the terms based on a trained model adapted to the IT documents (e.g., from the clustering unit 820). The system 330 is configured to perform boosting, via the boosting unit 830, to boost a rank of one or more terms of the ranked list 1000 based on the clusters 1020.

For example, as shown in FIG. 10, assume a cluster 1020 (Cluster 1) comprises the terms "thinkpad", "L380", "T480", "laptop", and "X270". Further assume that the ranked list 1000 comprises a term x (not shown) included in the same cluster 1020 (Cluster 1), wherein the term has a current ranky that is lower than ranks of the terms "thinkpad" and "laptop" (i.e., higher ranked terms), and higher than ranks of the terms "L380", "T480", and "X270" (i.e., lower ranked terms). The boosting unit 830 determines that the percentage of higher ranked terms (i.e., the terms "thinkpad" and "laptop") in the cluster 1020 (Cluster 1) is 40%. For each lower ranked term (i.e., the terms "L380", "T480", and "X270"), the boosting unit 830 determines a cosine similarity between the lower ranked term and all the higher ranked terms. For example, as shown in FIG. 9, a cosine similarity between the lower ranked term "L380" and all the higher ranked terms "thinkpad" and "laptop" is 0.9, a cosine similarity between the lower ranked term "T480" and all the higher ranked terms "thinkpad" and "laptop" is 0.7, and a cosine similarity between the lower ranked term "X270" and all the higher ranked terms "thinkpad" and "laptop" is 0.5. If a cosine similarity between a lower ranked term and all the higher ranked terms satisfies a pre-determined condition (e.g., exceeds a pre-determined threshold), the lower ranked term is boosted to a higher rank (e.g., current rank y plus 1). In one embodiment, after the boosting, the term x remains in a resulting improved list (not shown) at the current ranky, and boosted terms are added to the improved list after the term x (e.g., if the lower ranked terms satisfy the pre-determined condition, the terms "L380", "T480", and "X270" are added after the term "laptop").

Figure 11:
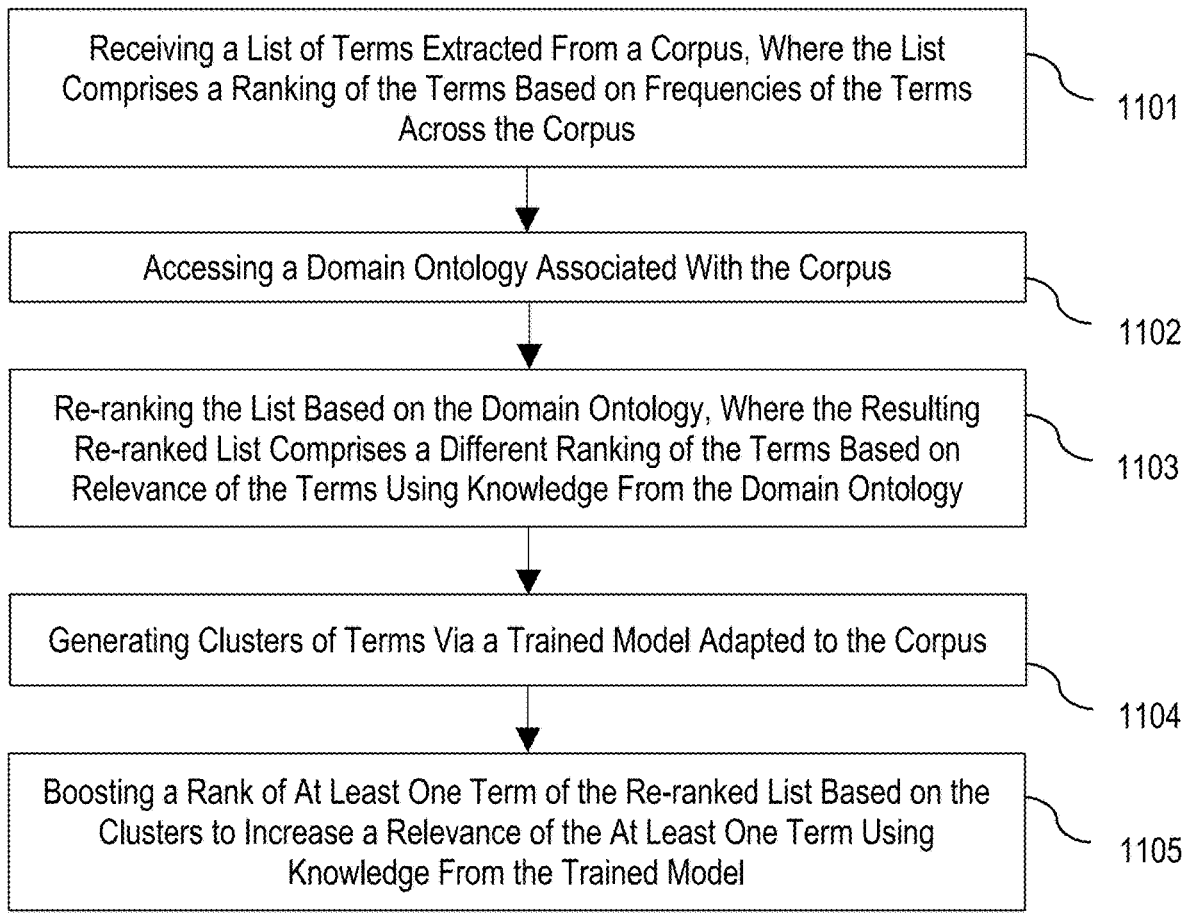
FIG. 11 is a flowchart for an example process for terminology ranking, in accordance with an embodiment of the invention.

FIG. 11 is a flowchart for an example process 1100 for terminology ranking for use in NLP, in accordance with an embodiment of the invention. Process block 1101 includes receiving a list of terms extracted from a corpus, where the list comprises a ranking of the terms based on frequencies of the terms across the corpus. Process block 1102 includes accessing a domain ontology associated with the corpus. Process block 1103 includes re-ranking the list based on the domain ontology, where the resulting re-ranked list comprises a different ranking of the terms based on relevance of the terms using knowledge from the domain ontology. Process block 1104 includes generating clusters of terms via a trained model adapted to the corpus. Process block 1105 includes boosting a rank of at least one term of the re-ranked list based on the clusters to increase a relevance of the at least one term using knowledge from the trained model.

In one embodiment, process blocks 1101-1105 are performed by one or more components of the terminology ranking system 330.

Figure 12:
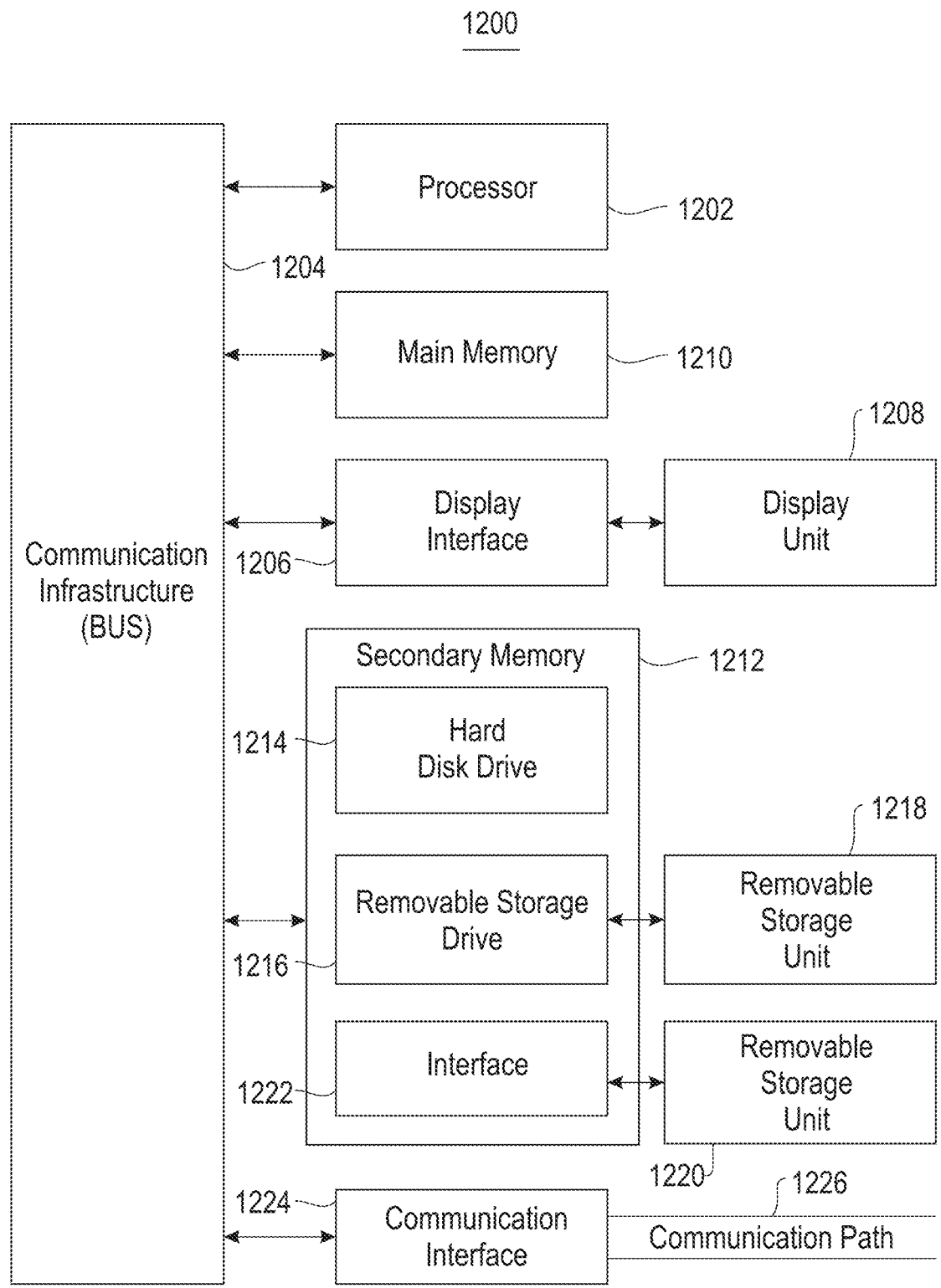
FIG. 12 is a high level block diagram showing an information processing system useful for implementing an embodiment of the invention.

FIG. 12 is a high level block diagram showing an information processing system 1200 useful for implementing one embodiment of the invention. The computer system includes one or more processors, such as processor 1202. The processor 1202 is connected to a communication infrastructure 1204 (e.g., a communications bus, cross-over bar, or network).

The computer system can include a display interface 1206 that forwards graphics, text, and other data from the voice communication infrastructure 1204 (or from a frame buffer not shown) for display on a display unit 1208. In one embodiment, the computer system also includes a main memory 1210, preferably random access memory (RAM), and also includes a secondary memory 1212. In one embodiment, the secondary memory 1212 includes, for example, a hard disk drive 1214 and/or a removable storage drive 1216, representing, for example, a floppy disk drive, a magnetic tape drive, or an optical disk drive. The removable storage drive 1216 reads from and/or writes to a removable storage unit 1218 in a manner well known to those having ordinary skill in the art. Removable storage unit 1218 represents, for example, a floppy disk, a compact disc, a magnetic tape, or an optical disk, etc. which is read by and written to by removable storage drive 1216. As will be appreciated, the removable storage unit 1218 includes a computer readable medium having stored therein computer software and/or data.

In alternative embodiments, the secondary memory 1212 includes other similar means for allowing computer programs or other instructions to be loaded into the computer system. Such means include, for example, a removable storage unit 1220 and an interface 1222. Examples of such means include a program package and package interface (such as that found in video game devices), a removable memory chip (such as an EPROM, or PROM) and associated socket, and other removable storage units 1220 and interfaces 1222, which allows software and data to be transferred from the removable storage unit 1220 to the computer system.

In one embodiment, the computer system also includes a communication interface 1224. Communication interface 1224 allows software and data to be transferred between the computer system and external devices. In one embodiment, examples of communication interface 1224 include a modem, a network interface (such as an Ethernet card), a communication port, or a PCMCIA slot and card, etc. In one embodiment, software and data transferred via communication interface 1224 are in the form of signals which are, for example, electronic, electromagnetic, optical, or other signals capable of being received by communication interface 1224. These signals are provided to communication interface 1224 via a communication path (i.e., channel) 1226. In one embodiment, this communication path 1226 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for terminology ranking for use in natural language processing, comprising:
    receiving, at a computing device, a list of terms extracted from a corpus, wherein the list comprises a ranking of the terms based on frequencies of the terms across the corpus;
    accessing a domain ontology associated with the corpus, wherein the domain ontology is a subgraph of a knowledge graph, and the subgraph comprises highest density of terms of the list mapped to entities of the knowledge graph;
    re-ranking, at the computing device, the list based on the domain ontology, wherein the resulting re-ranked list comprises a different ranking of the terms, and a term of the list and one or more aliases of the term are ranked higher in the re-ranked list if the term maps to an entity of the domain ontology;
    generating, at the computing device, clusters of terms via a trained model adapted to the corpus; and
    boosting, at the computing device, a rank of at least one term of the re-ranked list based on the clusters to increase a relevance of the at least one term using knowledge from the trained model.

2. The method of claim 1, wherein the trained model is a type embedding model.

3. The method of claim 2, further comprising:
    applying a text embedding technique to the corpus to obtain the trained model.

4. The method of claim 1, wherein each cluster of the clusters comprises a set of terms extracted from the corpus and clustered together as similar terms based on one of: term embeddings, type embeddings, or topics.

5. The method of claim 1, wherein accessing a domain ontology associated with the corpus comprises:

loading a generic domain ontology as the knowledge graph;

mapping the terms extracted from the corpus to entities of the knowledge graph;

identifying the subgraph of the knowledge graph; and extracting the subgraph as the domain ontology.

6. The method of claim 1, wherein accessing a domain ontology associated with the corpus comprises:

using an existing domain ontology as the domain ontology.

7. The method of claim 1, wherein re-ranking the list based on the domain ontology comprises:

linking at least one term of the list to an entity of the domain ontology; and for each term of the list that is linked to an entity of the domain ontology, boosting a rank of the term and one or more aliases of the term.

8. The method of claim 1, wherein re-ranking the list based on the domain ontology comprises:

determining a first set of scores based on semantic relations and a second set of scores based on network metrics using the knowledge from the domain ontology;

aggregating the first set of scores and the second set of scores to determine a final score; and re-ranking the list in accordance with the final score.

9. The method of claim 1, wherein boosting a rank of at least one term of the re-ranked list based on the clusters comprises:

for each term of the list:

selecting a cluster from the clusters that contains the term, wherein the cluster selected comprises one or more other terms extracted from the corpus that are similar to the term;

determining a percentage of the one or more other terms that have higher ranks in the list than a current rank of the term in the list;

determining whether the percentage satisfies a first pre-determined condition; and in response to determining the percentage satisfies the first pre-determined condition, determining whether to boost a rank of at least one term of the cluster selected that has a lower rank in the list than the current rank.

10. The method of claim 9, wherein determining whether to boost a rank of at least one term of the cluster selected that has a lower rank in the list than the current rank comprises:

for each term of the cluster selected that has a lower rank in the list than the current rank:

determining one or more cosine similarities between the term and the one or more other terms included in the cluster selected that have higher ranks in the list than the current rank;

determining whether the one or more cosine similarities satisfy a second pre-determined condition; and in response to determining the one or more cosine similarities satisfy the second pre-determined condition, boosting a rank of the term to a new rank based in part on the current rank.

11. A system for terminology ranking for use in natural language processing, comprising:

at least one processor; and a non-transitory processor-readable memory device storing instructions that when executed by the at least one processor causes the at least one processor to perform operations including:

receiving a list of terms extracted from a corpus, wherein the list comprises a ranking of the terms based on frequencies of the terms across the corpus;

accessing a domain ontology associated with the corpus, wherein the domain ontology is a subgraph of a knowledge graph, and the subgraph comprises highest density of terms of the list mapped to entities of the knowledge graph;

re-ranking the list based on the domain ontology, wherein the resulting re-ranked list comprises a different ranking of the terms, and a term of the list and one or more aliases of the term are ranked higher in the re-ranked list if the term maps to an entity of the domain ontology;

generating clusters of terms via a trained model adapted to the corpus; and boosting a rank of at least one term of the re-ranked list based on the clusters to increase a relevance of the at least one term using knowledge from the trained model.

12. The system of claim 11, wherein the trained model is a type embedding model.

13. The system of claim 12, wherein the operations further comprise:

applying a text embedding technique to the corpus to obtain the trained model.

14. The system of claim 11, wherein accessing a domain ontology associated with the corpus comprises:

loading a generic domain ontology as the knowledge graph;

mapping the terms extracted from the corpus to entities of the knowledge graph;

identifying the subgraph of the knowledge graph; and extracting the subgraph as the domain ontology.

15. The system of claim 11, wherein accessing a domain ontology associated with the corpus comprises:

using an existing domain ontology as the domain ontology.

16. The system of claim 11, wherein re-ranking the list based on the domain ontology comprises:

linking at least one term of the list to an entity of the domain ontology; and for each term of the list that is linked to an entity of the domain ontology, boosting a rank of the term and one or more aliases of the term.

17. The system of claim 11, wherein re-ranking the list based on the domain ontology comprises:

determining a first set of scores based on semantic relations and a second set of scores based on network metrics using the knowledge from the domain ontology;

aggregating the first set of scores and the second set of scores to determine a final score; and re-ranking the list in accordance with the final score.

18. The system of claim 11, wherein boosting a rank of at least one term of the re-ranked list based on the clusters comprises:

for each term of the list:

selecting a cluster from the clusters that contains the term, wherein the cluster selected comprises one or more other terms extracted from the corpus that are similar to the term;

determining a percentage of the one or more other terms included in the cluster selected that have higher ranks in the list than a current rank of the term in the list;

determining whether the percentage satisfies a first pre-determined condition; and in response to determining the percentage satisfies the first pre-determined condition, determining whether to boost a rank of at least one term of the cluster selected that has a lower rank in the list than the current rank.

19. The system of claim 18, wherein determining whether to boost a rank of at least one term of the cluster selected that has a lower rank in the list than the current rank comprises:

for each term of the cluster selected that has a lower rank in the list than the current rank:

determining one or more cosine similarities between the term and the one or more other terms included in the cluster selected that have higher ranks in the list than the current rank;

determining whether the one or more cosine similarities satisfy a second pre-determined condition; and in response to determining the one or more cosine similarities satisfy the second pre-determined condition, boosting a rank of the term to a new rank based in part on the current rank.

20. A computer program product for terminology ranking for use in natural language processing, the computer program product comprising a computer readable storage medium having program instructions embodied therewith, the program instructions executable by a processor to cause the processor to:

receive a list of terms extracted from a corpus, wherein the list comprises a ranking of the terms based on frequencies of the terms across the corpus;

access a domain ontology associated with the corpus, wherein the domain ontology is a subgraph of a knowledge graph, and the subgraph comprises highest density of terms of the list mapped to entities of the knowledge graph;

re-rank the list based on the domain ontology, wherein the resulting re-ranked list comprises a different ranking of the terms, and a term of the list and one or more aliases of the term are ranked higher in the re-ranked list if the term maps to an entity of the domain ontology;

generate clusters of terms via a trained model adapted to the corpus; and boost a rank of at least one term of the re-ranked list based on the clusters to increase a relevance of the at least one term using knowledge from the trained model.

* * * * *